April 14, 1964 E. E. GIBBONS 3,128,837
FILLING AND WEIGHING APPARATUS
Filed Feb. 1, 1960 7 Sheets-Sheet 2
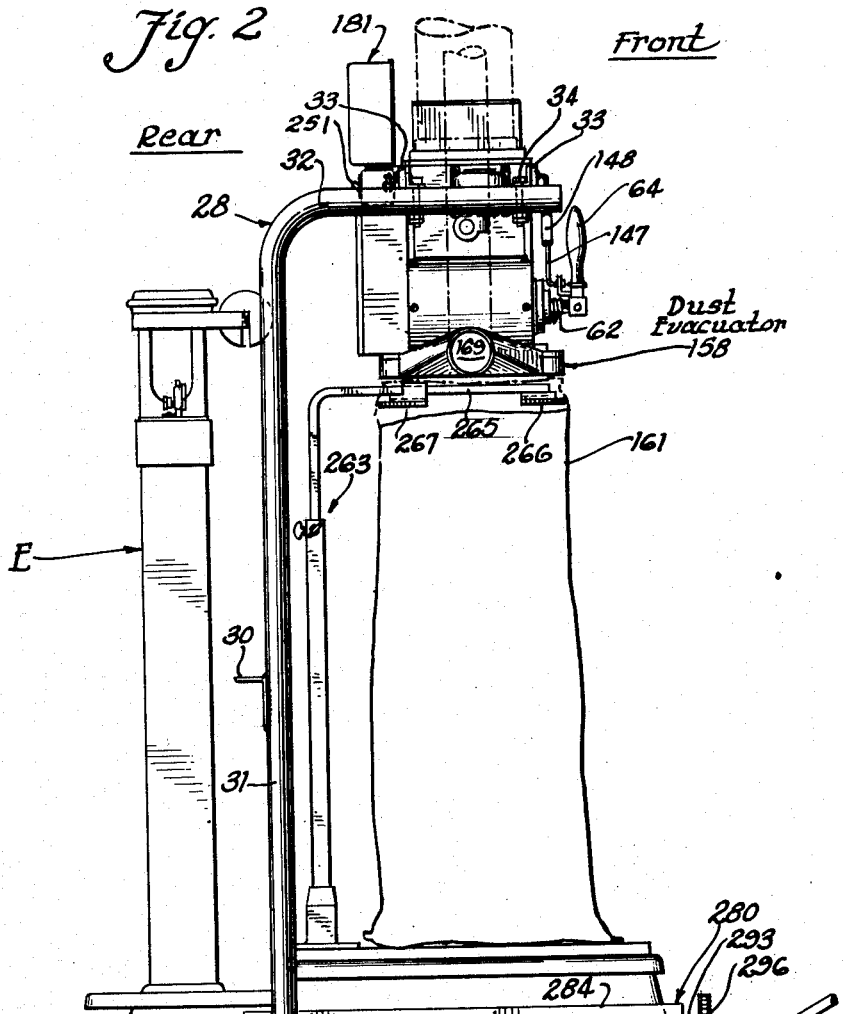
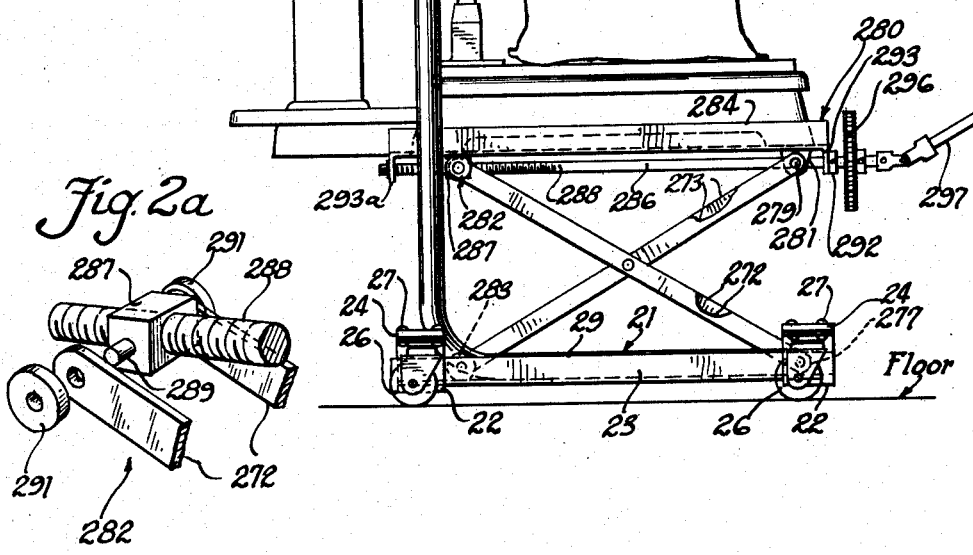

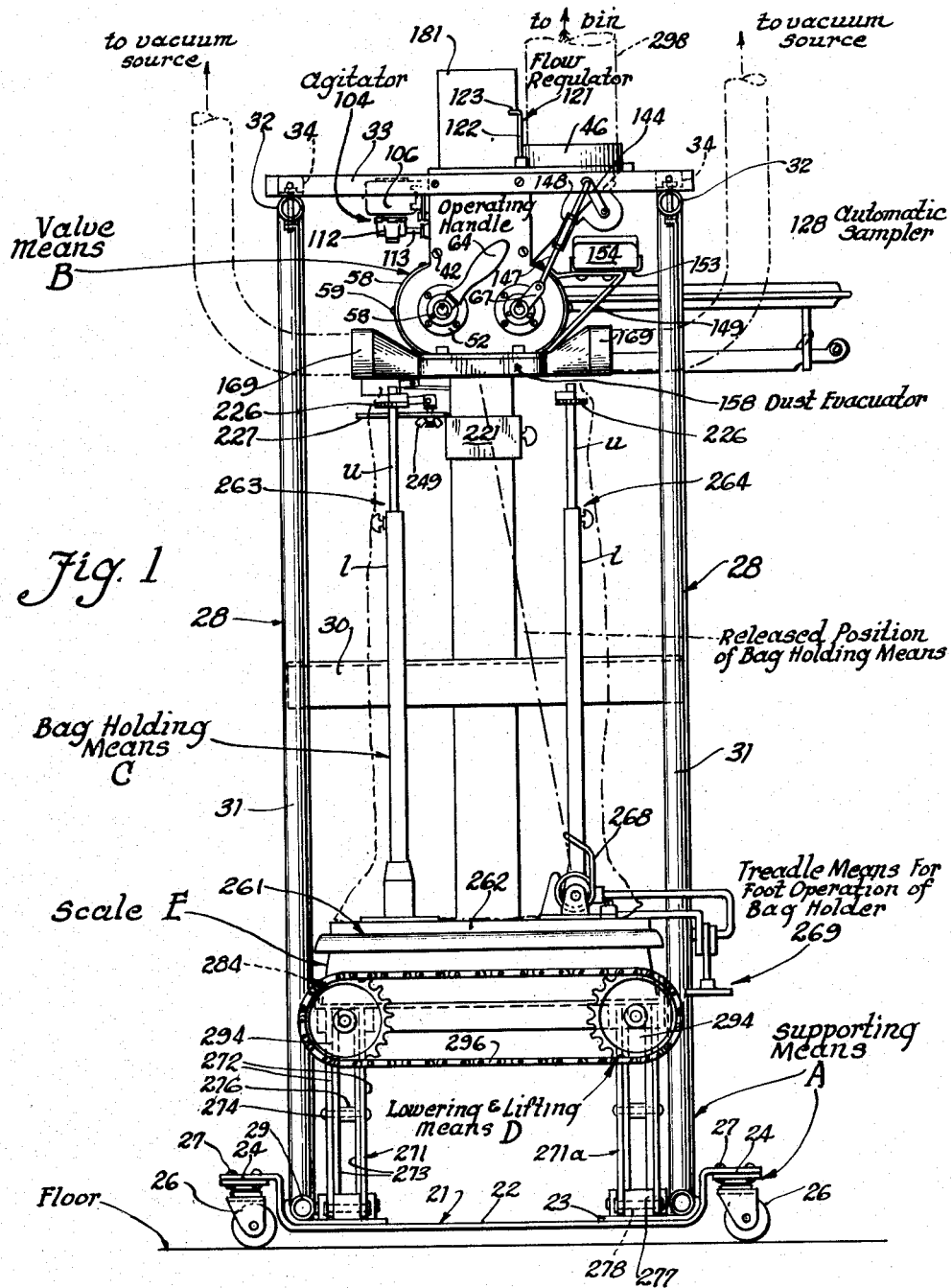

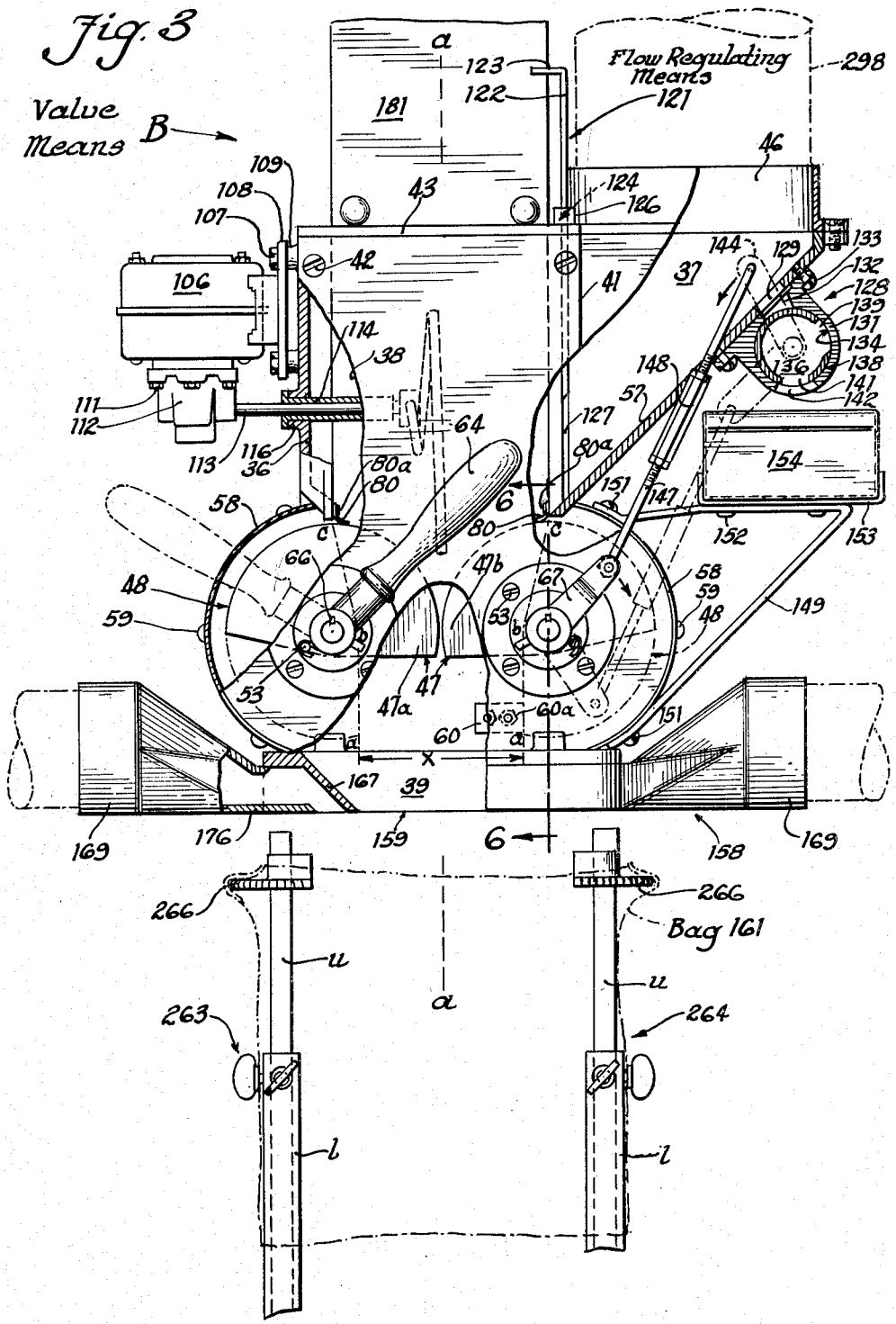

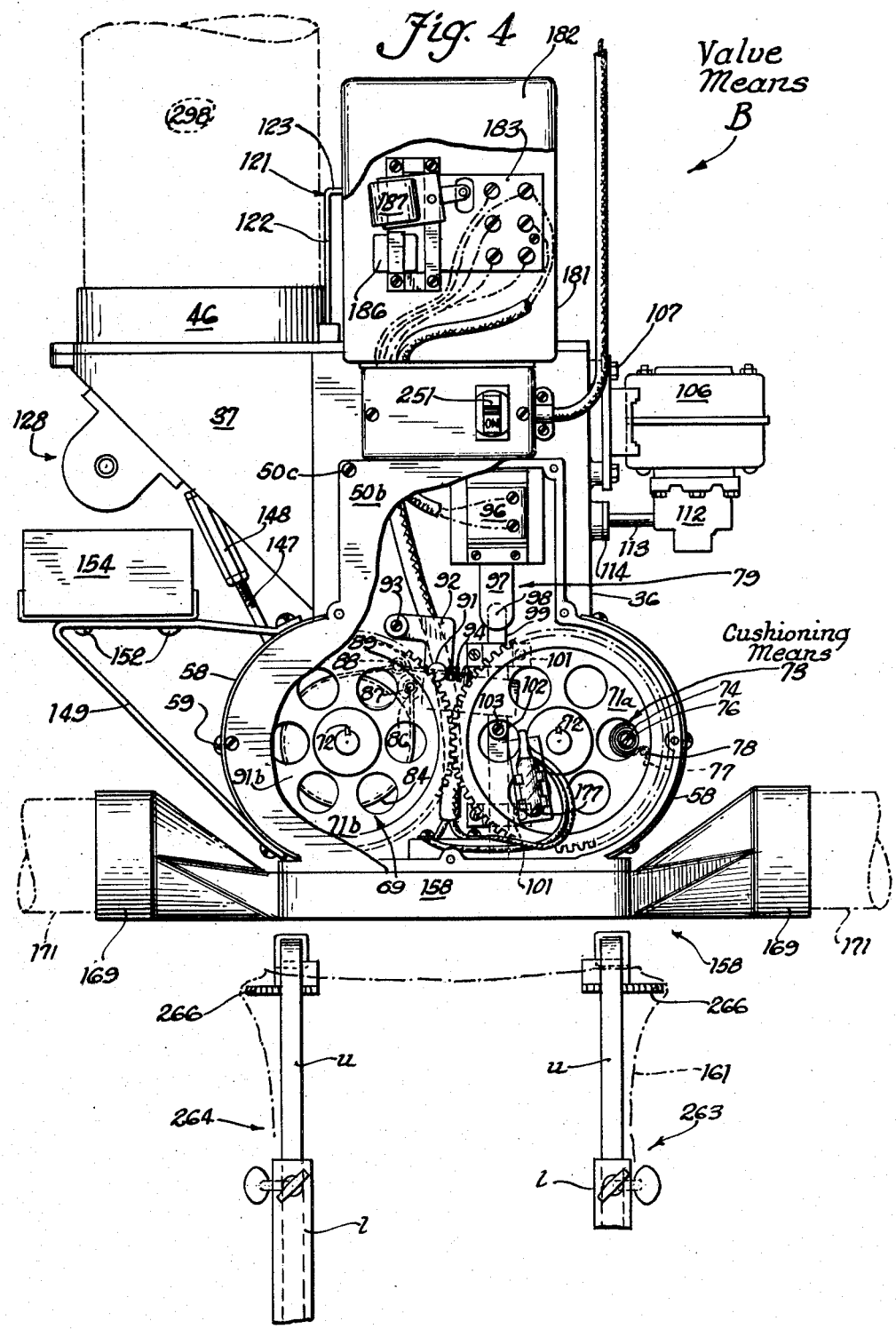

April 14, 1964 E. E. GIBBONS 3,128,837
FILLING AND WEIGHING APPARATUS
Filed Feb. 1, 1960 7 Sheets-Sheet 5

Counterpoise End of Scale Beam

United States Patent Office 3,128,837
Patented Apr. 14, 1964

3,128,837
FILLING AND WEIGHING APPARATUS
Earl E. Gibbons, deceased, late of Fort Lauderdale, Fla., by A. Lucile Gibbons, administratrix, Fort Lauderdale, Fla., assignor to A. Lucile Gibbons, Fort Lauderdale, Fla.
Filed Feb. 1, 1960, Ser. No. 5,942
19 Claims. (Cl. 177—76)

This invention relates generally to filling and weighing apparatus and more particularly to means for filling receptacles or containers such as bags with a definite quantity of material.

A primary object of this invention is to provide apparatus of improved accuracy and speed which, upon suitable initiation, starts the flow of a material such, for example, as grain, powder, or crushed ice, into a container and automatically stops the flow when a preselected quantity of material has flowed into the container.

Another object is the provision of improved control means for a weighing scale which makes the scale capable of increased accuracy in the high speed filling of containers with predetermined weights of material.

Another object is the provision of an improved combination of a material flow control valve, a weighing scale, and control means for controlling the flow of material through the valve into a container on the scale responsive to a predetermined weight indication by the scale.

Another object is the provision, with automatic bag-filling apparatus, of a bag-holder which grips and releases a bag in a filling position responsive to operation of a foot-actuated treadle so both of the operator's hands may be employed in moving the empty bag to, and the filled bag from, filling position.

Another object is the provision of an improved filling and weighing unit which is adjustable for use with a wide variety of bag heights and diameters.

Other objects include the provision of filling and weighing apparatus having automatic coupling means; an improved agitator which operates substantially free of vibration; and automatic de-dusting means which permits the operator to use the apparatus without a mask, even when bagging material coated with poisonous materials such as insecticides.

A still further object is the provision of an improved filling and weighing valve in which the casing is constructed in a particular offset manner so as to render the rate of flow of material therethrough, from a bin or hopper, substantially independent of bin pressure so as to make it possible, in presetting the apparatus for a certain filled weight, in the container, to compensate accurately for the quantity of unweighed material that has not yet reached the container at the instant of valve closure.

Another object, ancillary to the immediately foregoing object, is the provision of valve closure means which closes in the direction of flow of the material and at a velocity in excess of that of the material to avoid partial closure of the closure means due to entrapment of particles of material thereby.

Other objects and advantages will become apparent from the following description taken in connection with the drawings in which:

FIGURE 1 is a front elevational view illustrating one embodiment of the present invention;

FIGURE 2 is a side elevational view of FIG. 1 as seen from the left side;

FIG. 2a is a fragmentary perspective view of a portion of the scale lifting and lowering means which is shown more completely in FIGS. 1 and 2;

FIG. 3 is an enlarged fragmentary front view similar to FIG. 1 with certain parts cut away to better show the construction;

FIG. 4 is an enlarged fragmentary rear view with certain parts likewise cut away;

Like parts are designated by like reference characters throughout the drawings.

Figure 5:
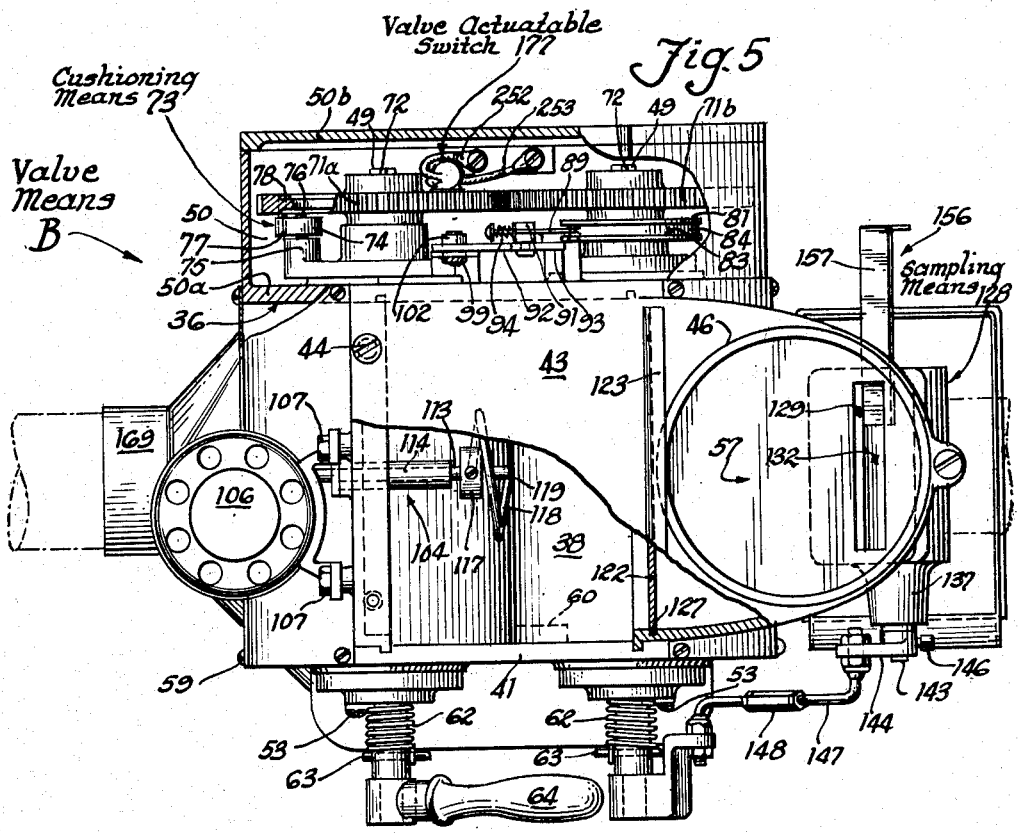
FIG. 5 is an enlarged top view of FIG. 1 with certain parts cut away.

Referring now more particularly to the drawings, the embodiment illustrated comprises in its broadest aspect supporting means A, valve means B, bag holding means C, and lifting and lowering means D, all associated with a scale E which has its weighing platform interposed between C and D. (See FIG. 1.)

As shown in FIGS. 1 and 2, the supporting means A comprises a platform generally designated 21, said platform comprising a pair of bar members 22 extending across the front and rear thereof, and a pair of angle members 23 extending from front to rear across the top side of the bar members. Each end portion of each bar member 22 is bent upwardly and provided with a horizontally extending end section 24 to which a caster 26 is mounted as by means of rivets 27. Atop the platform 21 and at each side thereof is mounted a supporting rod 28 which, in this case, is formed of tubing. Each supporting rod is formed with a bottom horizontal section 29, a rear vertical section 31, and a top horizontal section 32. For strength, an angle member 30 is mounted, as by welding, across the rear sections 31. The bottom section may be mounted on the platform 21 in a suitable manner as by welding to angles 23 or by bolting or riveting, if preferred. Across the top sections of the supporting rod are a pair of straight bar members 33 mounted thereto by angles 34, and which are used to support the valve assembly (to be described) at a fixed, predetermined height above the floor.

From the foregoing, it will be seen that the supporting means A and the parts B, C, D, and E supported thereby comprises a self-contained, portable unit which may readily be moved on casters or rollers 26 from one bin of material to another.

As best shown in FIGS. 3, 4 and 5, the valve means B comprises a casing 36 which may be of cast materal, for example, aluminum, which is provided with an inlet port 37, an agitator chamber 38 and an outlet port 39. On the front of the casing a cover plate 41 is mounted as by means of screws 42. At the top of the casing another cover plate 43 is mounted as by means of screws 44, plate 43 having an upstanding inlet portion 46 registering with the inlet port 37. At the rear of the casing, as shown in FIG. 5, is a gear compartment 50 defined by the inner rear wall 50a and cover plate 50b, the latter being held in place by screws 50c (FIG. 4).

A closure means or valve generally designated 47 (FIG. 3) comprising a pair of longitudinally truncated cylindrical elements 47a and 47b, is provided in the casing intermediate the inlet and outlet ports. Each of the elements 47a—47b comprises a hollow (see FIG. 6) member which may be cast of metal as for example, aluminum, the outer non-truncated surface 48 of which is preferably machined to a smooth, hemi-cylindrical configuration. Each surface 48 preferably extends somewhat more than 180° about its central axis. Each of the closure elements is mounted on a shaft 49 which extends from front to rear through the casing. At the front end, each shaft 49 extends through the cover 41 and is provided with a ball bearing 51 mounted in bearing retainer 52, the latter being attached to the cover 41 as by screws 53. Each closure element 47a and 47b is formed with a centrally located, inwardly extending boss 54 through which pins 56 extend to make each closure element rotatable with its respective shaft 49. At the rear of each shaft 49 is provided a bearing 51a and bearing retainer 52a affixed to the intermediate rear wall 50a of the casing as by means of screws 53a. The front and rear end portions of the shafts 49 extend beyond their respective bearing retainers 52 and 52a for cooperation with elements which will be described hereinafter. As shown in FIGS. 3 and 5, a block 60, attached to the forward casing cover plate 41 as by means of bolts 60a, is provided to engage the closure element 47b to act as a stop for the valve in the opening direction.

It will be observed (FIG. 3) that the inlet port 37 is offset horizontally from the center line of the valve; that is, a vertical line a—a drawn centrally between the closure elements 47a—47b. This is an important feature of the present invention in that it eliminates the varying flow rates that otherwise would be caused by varying bin pressures if the closure elements were directly beneath the inlet port. It will also be observed that the bottom wall 57 of the inlet port is disposed at an angle, to facilitate free flow of material and to make the inlet port self-cleaning. The angle should be chosen at some degree above the angle of rest of the particular material to be weighed. In the case of shelled, glazed, dry corn, for example, for which the angle of rest is about 22½°, it will be preferable that the bottom wall 57 be disposed at least about 30° from the horizontal. In the embodiment illustrated, the bottom 57 is disposed at about 45°, which I have found to be suitable for a great variety of materials including shelled corn, clover seeds, crushed ice, sugar, and the like. Arcuately extending, formed cover plates 58 are mounted on the sides of the casing as by means of screws 59 to complete the enclosure for the elements 47a, 47b.

Figure 6:
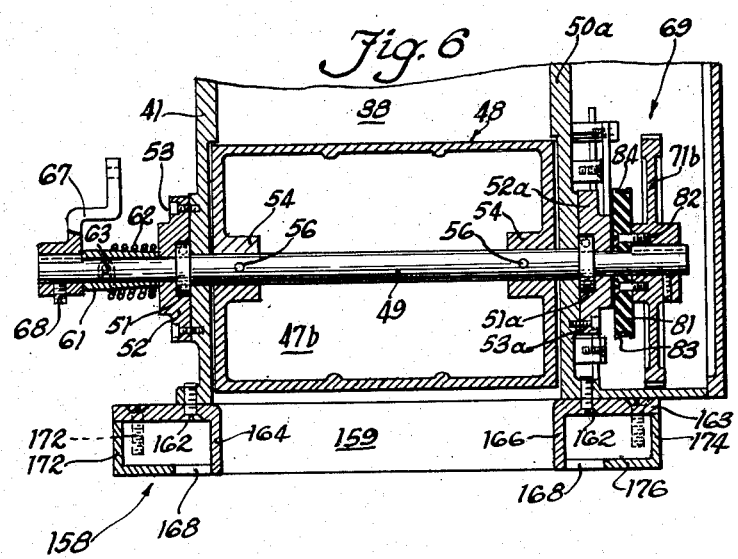
FIG. 6 is a vertical sectional view of FIG. 3 taken along the line 6—6.

As shown in FIG. 6, the front end portion of each of the shafts 49 is provided with a bushing 61. Surrounding each bushing is a torsion spring 62, one end of which is hooked on an outward extension of one of the bolts 53 (see FIG. 3), the other end of which is hooked against pin 63 which is retained in a transverse bore through the shaft. The torsion springs 62 are provided to bias closure elements 47a and 47b in clockwise and counter-clockwise directions, respectively, as viewed in FIG. 3. In other words, the torsion springs are employed to bias the closure means or valve 47 toward the closed position shown in solid lines in FIG. 3. A handle 64 is mounted on the end of the shaft of closure element 47a, key 66 being provided to prevent relative rotation between the handle and the shaft. The forward end portion of the other shaft is provided with a lever 67 which is affixed in the same manner as the handle 64, set screws 68 being provided to prevent endwise displacement of the lever and handle from their respective shafts. The lever 67 is utilized to operate the automatic sampling means as will be described subsequently.

As shown in FIG. 4, means, generally designated 69, for correlating or timing the operation of the two valve segments 47a, 47b comprises in the present instance a pair of gears 71a, 71b which are keyed by means 72 to the ends of the valve shafts 49. Thus, when the handle 64 is rotated to move valve sector 47a 200° in a counter-clockwise or opening direction, the sector 47b will likewise be rotated an identical amount in the opposite and also opening direction by the gear means 69.

Figure 11:
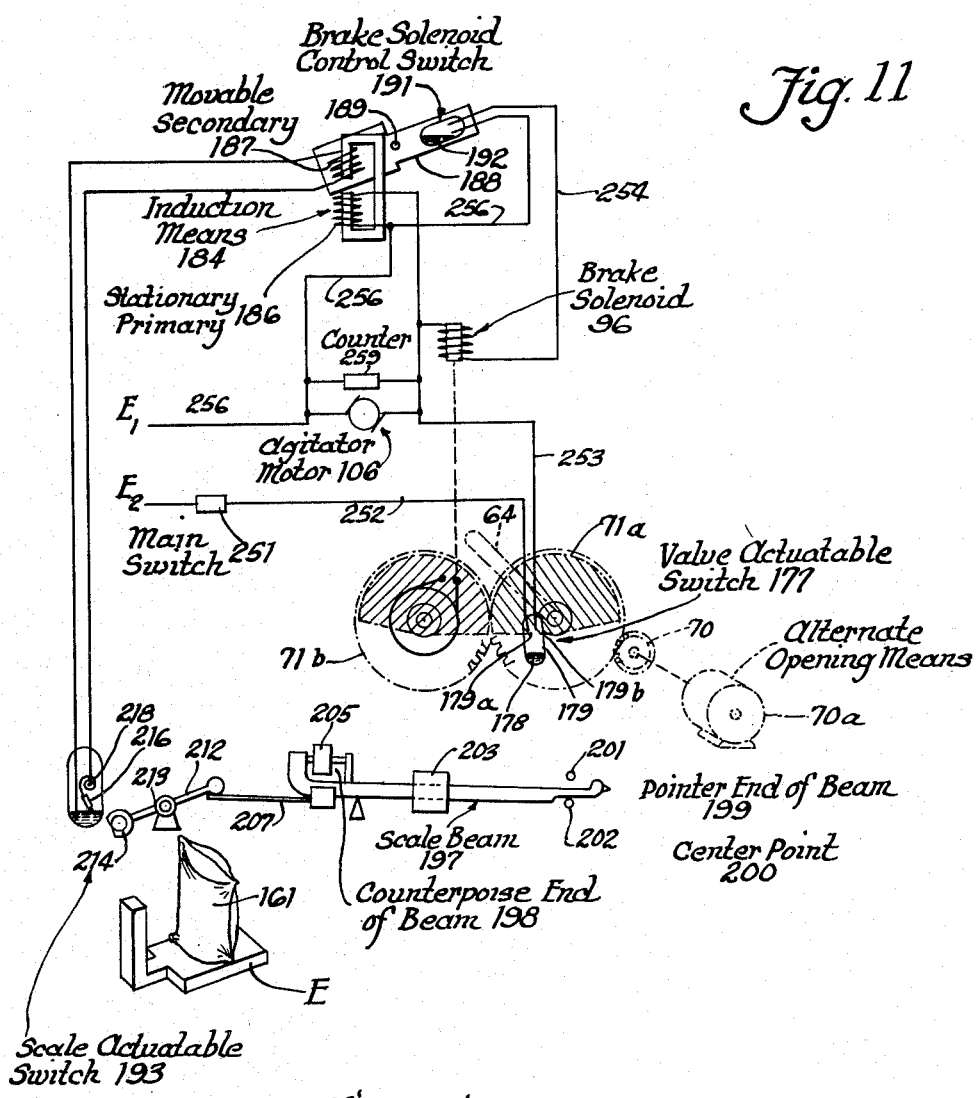
FIG. 11 is a circuit diagram showing the electrical co-relations of the various elements.

As shown diagrammatically in FIG. 11, alternate opening means for the valve 47 may comprise a pinion 70 and a motor 70a, the latter being energizable by any suitable switch and circuit means (not specifically shown).

Some materials, such as fine, flat seeds have a tendency to stick to the surface of the closure elements 47a—47b. Where such materials are being bagged regularly it will be preferred to provide cleaning means comprising a wiper blade 80 made of felt or like material affixed by screws 80a to contact the cylindrical valve surfaces when the valve is closed or opened. (See FIG. 3.)

When the valve sectors are both in wide open position, as indicated by the broken lines in FIG. 3, they will both be urged in their respective closing directions by the torsion springs 62. When the valve is closed under the urgence of these springs, it will be apparent that considerable energy will be built up in the rotating sectors by the time they near the end of their respective closing movements and the parts would be subjected to a substantial shock if the sectors were stopped suddendly. Cushioning means generally designated 73 (FIGS. 4 and 5) is therefore provided to spread this shock out over a few degrees of revolution and therefore absorb the kinetic energy in the sectors without shock. This cushioning means in the present instance comprises a torsion spring 74 mounted on a member 75 (FIG. 5) which is stationarily mounted by any suitable means on the back plate 50a of the casing by screw 76 and having a hooked, free end portion 77 engageable with pin 78 carried by gear 71a.

As best shown in FIGS. 4 and 5, solenoid actuated brake or stop means, generally designated 79, is provided for holding the valve 47 in open position against the urgence of biasing means 62 until the container being filled has received a predetermined weight of material. The brake means 79 comprises in this instance a brake disc 81 mounted on the forward side of gear 71b, as by means of screws 82. The disc 81, or at least its outer peripheral portion, will preferably be made of some frictional, heat resistant material such as asbestos-impregnated, laminated, phenol-formaldehyde plastics material. The outer peripheral edge of the brake disc 81 is formed with a groove 83 in which is seated a flexible steel strap 84. As shown in FIG. 4, one end 86 of the strap is formed into a loop which is held by pin 87 carried by the intermediate back wall 50a of the casing. From pin 87 the strap extends almost entirely around the brake disc in the groove 83 to a point 88 where it is engaged by a substantially horizontal rod 89 which extends through a transversely drilled hole in boss 91 carried by the Z-shaped lever member 92 which is pivoted at 93 on the casing wall 50a. At the end of rod 89, opposite the point 88, is provided a compression spring 94 which is utilized to load the brake strap 84 when the brake means is actuated. Thus, it will be apparent that the brake may be actuated by rotating the lever 92, counter-clockwise, to compress spring 94 and press the strap 84 into frictional engagement with the peripheral groove 83 of the brake disc. To operate the brake electrically, a solenoid 96 is mounted to the back side of the casing wall 50a in any suitable manner and has an armature which will be drawn upwardly when the solenoid is energized. Extending downwardly from the armature, and pinned thereto at 98, is a rod 99 which is guided at spaced points by brackets 101. A roller 102 is carried on rod 99 by means of bolt or pin 103 at a position just beneath the extreme free end portion of the Z-shaped lever 92. In operation, when the solenoid 96 is energized, the roller 102 will be moved upwardly against the end of lever 92, rotating the latter counter-clockwise and applying the brake strap 84 to the brake disc 81. One of the important functions of the compression spring 94 is to permit full stroke operation of the armature 97 to give the solenoid a long service life.

To prevent stoppage of flow due to clumping, as for example when wet or damp materials are being weighed, a novel form of agitating means, generally designated 104 (FIGS. 3 and 5), is provided. As will be seen, one of the distinct advantages of this agitating means over those previously employed is that it is quiet and absolutely free from vibration when operating. It comprises a motor 106 mounted as by bolts 107 on the left side wall (FIG. 3 or 5) of the casing 36. For mounting the motor as aforesaid, the motor is provided with a suitably apertured mounting flange 108 and the side wall of the casing is reinforced around the bolt areas by bosses 109. Attached to the motor, as by bolts 111, is a speed reducing, torque increasing gear-head 112 having a driven shaft 113 extending through the casing side wall, the shaft being supported for a substantial length by bushing 114 which is mounted as by means of a drive fit in the reinforcing boss 116. The inner end of the drive shaft 113 carries a collar 117 having attached thereto by any suitable means an agitating element 118 comprising a rod having the form of a forwardly advancing spiral. The outer extremity 119 of the element 118 is disposed to describe a circular path in a vertical plane, the latter being tangent to the outer surfaces 48 of the valve segments 47a, 47b when the latter are in closed position and the extremity 119 is preferably spaced radially from the shaft 113 a distance sufficient that it will extend down partially between the two valve sectors, as shown in FIG. 3, to maintain the flowing material agitated proximate the inlet side thereof.

Certain materials which it is desirable to fill and weigh with the present device will naturally flow much more rapidly than others. For example, fine spherical or oval seeds such as clover, celery and grape seeds will flow almost like water compared with large, irregular-shaped seeds such as corn. To compensate for this variation in flow rates of different materials, flow regulating means, generally designated 121 (FIG. 3), is provided in the casing at the outlet side of the inlet port 37. This flow regulating means comprises in the present instance a vertical gate 122 having a transverse handle or gripping portion 123 and being slidably mounted in the casing through an upper elongated slot 124 formed in the upstanding boss 126. Vertically extending guide slots 127 are formed for the gate or baffle 122 in the front and rear walls of the inlet portion of the casing. Preferably, the casing will be so constructed that the cross-sectional area through the entrance opening 46, inlet 37 (when the baffle is wide open), and the agitator chamber 38 will be at least the same as the cross-sectional area $x$ (FIG. 3) between the valve sectors when the latter are in their wide open positions.

The cross-sectional configuration of the valve sectors is of considerable importance in providing free flow of material through the valve. As shown in FIG. 3, where the cross-section of each sector in the open position is indicated by broken lines, the periphery may be described as $a$—$b$—$c$ where, at the time the valve is wide open the surface $a$—$b$ is substantially vertical, the surface $b$—$c$ extends upwardly and outwardly to a point just under the edge of the casing side wall to thereby avoid accumulation of material on the top of the valve segment which would be the case if any of the surface $c$—$a$ were permitted to protrude into the stream. It will be recognized that the cylindrical surface $c$—$a$ is the same as those previously designated 48.

The cylindrical surfaces 48 in practice will be machined or otherwise formed fairly smooth, and concentric with their respective axes, so that when the valve sectors are closed (full line positions, FIG. 3) there will be, at most, only a few thousandths of an inch space between them at any point along their length so as to retain even fine powdered materials such as flour, graphite, powdered metals, and the like, when the device is being used to bag them.

The problem of preventing particles being caught between the valve sectors as they are rotated toward closed position and thereby causing them to be held in partly open condition has been solved by a novel arrangement of parts whereby the flow is substantially parallel to the movement of the leading sector edges $c$ near the point of closure and by adjusting the biasing springs 62 to exert sufficient force on the sectors that the latter will be rotating at a peripheral speed exceeding the falling speed of the particles at the point of closure. In other words, by offsetting the inlet port 37 to a point out of vertical alignment with the valve sectors, I eliminate the major part of the velocity imparted to the material by bin pressure so that for all intents and purposes as far as the valve is concerned, the material starts falling from some fixed point beneath or at the gate 122. Since the acceleration of gravity on all materials is the same, then the flow rate due to gravity of all materials is substantially the same at the outlet position between the valve sectors. All that is necessary, therefore, to prevent my valve from clogging on being closed is to adjust the torsional force exerted by the biasing springs 62 sufficiently great that the leading edges $c$ of the sectors move downward faster than the particles at the point of closure.

In bagging grains such as shelled corn, it is often a customary requirement that a sample of grain going into each bag be taken and preserved for test. Previously this has been more or less haphazardly done, the workman taking an indeterminate quantity from each bag after it has been filled and with such a manual system there is never any assurance that all bags have been sampled or that a uniform quantity has been taken from each bag. To remedy this situation in my device and to make the sampling entirely automatic and at the same time completely uniform, I provide the sampling means generally designated 128 which will now be described.

The bottom wall 57 of the casing inlet is formed with a sampling aperture 129. Mounted on the outside of the casing is a sampler housing 131 having an inlet port 132 in registration with the opening 129. In the present instance, screws 133 are provided to attach the sampler housing to the casing. The sampler 131 is formed with a bore 134 which is closed at the front one end by wall 136 and open at the other. Inserted in the open end is a hollow plug member 137 (FIGS. 3 and 5) having an outer cylindrical surface 138 in seating engagement with the bore 134 and being provided with longitudinally extending inlet and outlet passages 139 and 141, respectively. The sampler housing is further provided with an outlet port 142 at the bottom side thereof. The forward, exterior end portion of the plug 137 is provided with a reduced-diameter stem portion 143 to which lever 144 is attached by means of a set-screw 146. The lever 144 is connected to the previously described lever 67 by link means 147, the latter being provided with turnbuckle adjusting means 148 for setting it at a desired length.

Bracket means 149 is mounted by screws 151 to the casing cover plate 58 below the sampling device. Mounted on the bracket means as by rivets 152 is a tray 153 having a sample collector drawer 154 positionable thereon to receive and accumulate the samples.

In use, the sampling device will operate as follows: (As will be described subsequently, the handle 64 will be turned manually once for each bag or container of material.) The turning of handle 64 will turn levers 67 and 144 causing plug passage 139 to register with the sampler inlet port 132 and receive a sample of material. At this time, of course, the plug passage 141 will be moved out of registration with the outlet port 142 and hence the sample will remain in the sampler until the valve 47 is moved back to closed position at which time the passage 141 will register with outlet port 142 and discharge the contents into the collector drawer 154. In the present instance, the above-described sampling cycle will be repeated once for each bag or container filled.

The quantity of material taken for each sample is determined by sample regulating means generally designated 156 (FIGS. 3 and 5) and comprising in this instance a baffle or slide plate 157 interposed between the housing 131 and casing wall 57 so as to control the amount of inlet port 132 exposed to the stream of material.

As it is conventionally carried out, the filling of bags or other containers with comminuted or powdered materials involves charging the surrounding atmosphere with dust which is at least annoying and can be hazardous to workmen. In cases where dry seeds, such as corn, are being bagged, the atmosphere may be charged with insecticide dust of sufficient toxicity to require that the workmen wear masks. These masks are most uncomfortable to wear, especially during hot weather, and furthermore, they are more than often so inefficient that, in spite of their use, hazardous percentages of the toxic dusts are inhaled. In the use of my device this dust menace is entirely eliminated and, furthermore, the operators may work without wearing masks. As best shown in FIGS. 3, 4 and 5, dust evacuator means, generally designated 158, is provided to automatically eliminate any dust issuing, with the material being bagged, from the outlet port 39 of the valve casing or rising from the interior of the bag 161 being filled. As will be noted in FIG. 6, the outlet port 39 is in this instance formed in a separate member 159, made, for instance, of cast aluminum mounted on to the bottom of the main casing portion 36 by screws 162. The outlet member 159 comprises a horizontal flanged section 163, front and rear vertical walls 164 and 166, respectively, and (FIG. 3) inwardly converging diagonal side walls 167. The dust evacuator 158 may be a casting as, for example of aluminum, and is formed to provide a dust inlet passage 168 extending completely around the periphery of the outlet member 159 and a pair of dust outlet ports 169 connecting by pipe means 171 to a suitable vacuum source such, for example, as a Cyclone separator (not shown). If desired, the vacuum source may be driven by a motor which is actuated when the handle 64 is turned to open the valve closure means. In such case the motor may be connected as is the agitator motor 106 (see FIG. 11). The dust evacuator housing is attached to the casing outlet flange 163 as by means of screws 172. It includes front and back vertical side walls 173 and 174 spaced respectively from walls 164 and 166 and a bottom wall 176 extending horizontally in spaced relation with respect to the flange 163. It will be observed that by the construction disclosed the dust evacuator may be removed if it is not needed merely by unscrewing screw members 172. In any case, the outlet port member 159 will preferably be utilized and therefore the spacing between the bottom of the casing and the top of the bag will be undisturbed whether the dust evacuator is kept or not.

Circuit means rendering the operation of the device completely automatic after manual initiation by turning the handle 64 will now be described. That circuit means is best shown in FIG. 11 and reference should be made to it in connection with the immediately following description.

Valve actuatable switch means 177 (FIG. 4) is, in the present instance, a normally open mercury switch carried by gear 71a. By "normally open" I mean that when the valve or closure means 47 is in closed position (as shown in FIG. 11) the switch will be open; that is to say, the mercury globule 178 will be at the bottom of the glass envelope 179, out of shorting contact with the electrodes 179a and 179b. The switch means 179 may be mounted on the gear 71a for rotation therewith in any desired manner as, for instance, by screws (not specifically shown). It will be seen, as the description proceeds, that other specific switch means actuatable responsive to the movement of handle 64 may be used instead of switch 177, it not being essential that the switch actually be carried by the gear as shown.

As shown in FIG. 4, a control box 181 having a cover 182 is mounted at an upper portion of the casing 36. Within the box, on plate 183, is induction means generally designated 184 (FIG. 11), comprising in this instance a stationary primary coil 186 and a movable secondary coil 187. The movable secondary 187 is carried by a plate 188 which is pivotally mounted at 189 on the control box. Also carried by the pivotal plate 188 is a normally open brake solenoid switch 191. By "normally open" in this instance I mean that the mercury globule 192 is out of shorting contact with the electrodes when the plate 188 is in its lower pivotal position. The induction means is so arranged that when current is flowing in the stationary primary, and the secondary 187 is closed by switch means to be described, current will be induced in the secondary. The magnetic fluxes of the two coils will oppose one another and thrust the movable secondary and plate 188 upward to a position to close switch 191. It will be apparent that the construction may be modified, if desired, to make coil 187 stationary and coil 186 movable, in which case the brake control switch 191 may be actuated responsive to coil 186. As seen in FIG. 11, closing of brake control switch 191 causes energization of brake solenoid 96.

The brake solenoid 96 which is an integral part of the control circuit has been initially described above. A scale actuatable switch, generally designated 193, is provided to open and close the circuit of movable secondary 187 at times responsive to movement of a scale pointer to and from a pre-selected weight indicating position.

At this point, it is thought best to describe briefly the scale or weight indicating device which may be used in connection with the filling and scaling apparatus. Any type of weighing device may be utilized. I have specifically illustrated a beam type platform balance E. The wheels or rollers which normally are provided on such balance have been removed and the entire balance is supported by the lifting and lowering means D which will be described in detail subsequently. The bag 161 is supported atop the platform of the balance by means which also will be described in more detail subsequently.

Returning now to the more or less diagrammatic representation of the weight indicating parts of scale E in FIG. 11, it will be seen that the scale beam 197 is fulcrumed in the usual manner and has the conventional counterpoise end portion 198 and pointer end portion 199, the latter being movable between upper and lower limiting stops 201, 202, respectively. Weight 203 is movable back and forth along the scale beam 197 to preselect the weight of material to be fed into the bag 161.

Figure 7:
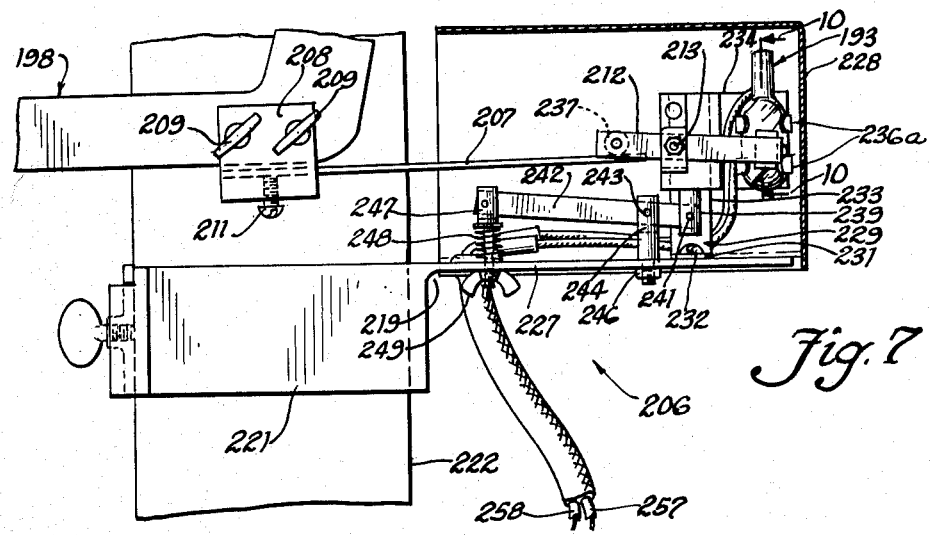
FIG. 7 is an enlarged view of the scale actuatable switch, its adjustment mechanism, and the linkage mechanism making it operable, responsive to movement of the scale beam.
Figure 8:
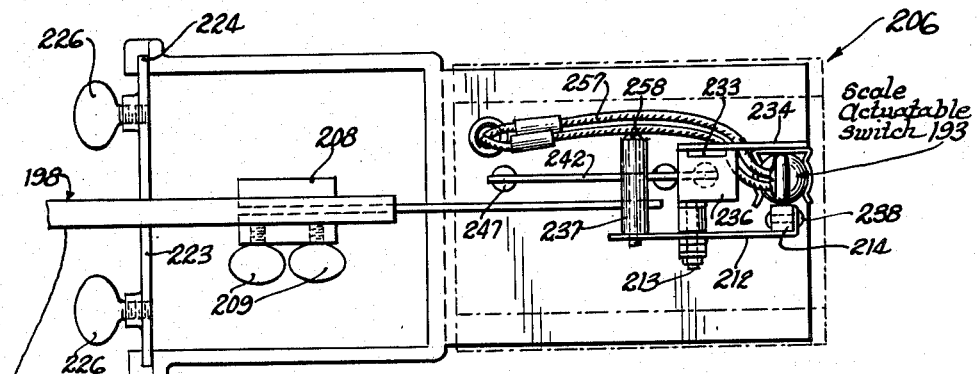
FIG. 8 is a top view of FIG. 7 with the cover plate removed.
Figure 10:
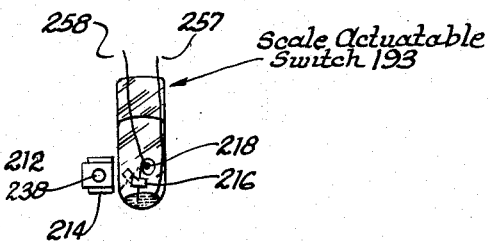
FIG 10 is a sectional view of FIG. 7 taken along the line 10—10 and showing the internal details of the scale actuatable switch.

The above described conventional beam arrangement may be adapted for use with my apparatus by the adapter means generally designated 206. As shown in FIGS. 7 and 8, and diagrammatically in FIG. 11, the adapter means comprises a rod 207 extending rearwardly from the beam and attached to the counterpoise end of the beam by U cross section clamping member 208 which is held thereon by clamp screws 209. The extension rod 207 is secured in a suitable bore in the member 208 by means of lock screw 211.

The cooperation of the beam 197 with the scale actuatable switch 193, through the extension 207 and lever 212, is illustrated in simple, diagrammatic form in FIG. 11. The lever 212 is pivoted at 213 and has at its far end a magnetic wand 214 which is movable to a position to attract the armature 216 carried by the movable electrode within the envelope 217 to open the switch. It is of the normally-closed type in that the resilient spiral spring section 218 biases the movable electrode carrying the armature 216 toward the mercury-contacting position.

Thus, when the bag 161 is empty, that is, in the to-be-filled position, and weight 203 is moved to a pre-selecting position along the scale, the pointer end of the beam will be down, upon stop 202. The extension 207 will therefore be in its "up" position, lifting the corresponding end of lever 212. The magnetic wand at the opposite end will consequently be in its "down" position, which is far enough away from the armature 216 to permit the armature to be released and the switch to be in its normal or "closed" position.

In short, when the pointer end is "down," the wand end of lever 212 is likewise "down."

Figure 9:
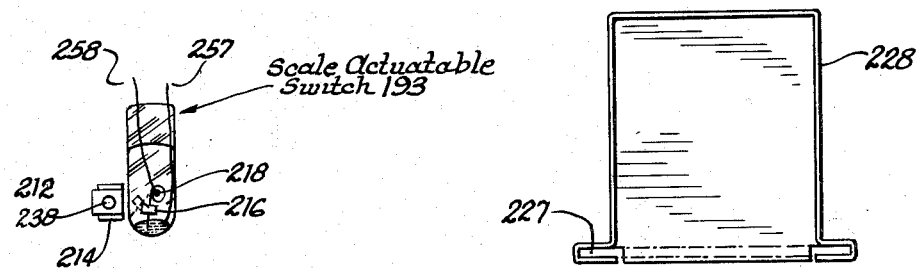
FIG. 9 is an end view of FIG. 7 as seen from the right.

Describing now more specifically the structure shown in FIG. 7, a supporting member 219 which may be of metal as, for example, cast aluminum is provided with a yoke portion comprising a pair of arms 221 embracing the post 222 of the balance and having means for mounting same on the post including a removable plate or bar 223 engageable in slots 224 of the arms 221 and having locking screws 226 for holding it in place. The support 219 also comprises a horizontally extending integral shelf portion 227 on which is mounted cover means 228 (FIG. 9). Within the cover means is provided an angle member 229 (FIG. 7) having horizontal portion 231 mounted to the shelf by means of screw 232. The upstanding portion 233 of the angle member 229 has vertically slidably mounted thereon a plate 234 and a block 236 (FIG. 8), said block being vertically grooved for receiving the angle upstanding portion 233 and being attached in any suitable manner as by welding or soldering to the plate 234. The balance-actuatable switch 193, already described in connection with FIG. 11, is mounted on plate 234 as by means of clamps 236a (FIG. 7) secured in any suitable manner to the plate. The lever 212 carries at one end a roller 237 against which the end of rod 207 bears. The lever 212 is pivoted on bolt 213 and at its opposite end carries the magnetic wand 214 which is attached as by screw means 238. The lever 212 is heaviest on the roller side so it is constantly biased in a counter-clockwise (FIG. 7) direction to bear at all times upon the end of rod 207. An adjusting linkage to effect up and down adjustment of the parts carried by plate 234 includes a downwardly disposed pin 239 carried by the block 236 and having pivotally mounted on pin 241 an adjusting lever 242 which itself is pivoted on pin 243 carried by upstanding stationary rod 244 which is mounted on shelf 227 as by means of nut 246. At its left-hand end (FIG. 7) the lever 242 is pivotally engaged with a vertical screw member 247, the latter being biased upwardly by compression spring 248 seating atop the shelf 227. Adjusting wing nut 249 will be effective to move the plate 234 and the parts carried thereby up or down depending upon which direction the adjusting nut is turned.

The adjusting means (FIGS. 7 and 8) for the scale actuated switch 193 makes it possible to open or close the switch at a predetermined pivotal position of the beam. For best results, I have found it convenient to set the adjustment nut 249 so the switch 193 is opened just after the beam pointer 199 begins to rise from stop 202. For the utmost accuracy with this type of use, the scale beam should be zeroized, by adjustment of the counterpoise 205, with the pointer on the lower stop 202 instead of at the centerpoint 200 as is conventional. As will be pointed out subsequently, opening of switch 193 responsive to the filling of the bag or container 161 with a predetermined weight of material causes the valve closure means 47 to shut off the flow of material. At the instant of closure there is still a small quantity of material, unweighed, in the air between the valve and the bag. For convenience in description, that small additional quantity is referred to hereinafter as "aftercharge." It is necessary to adjust the device to open switch 193 at a weight somewhat less than the desired filled weight of the bag to compensate for the aftercharge.

Taking a specific example, assume a cotton bag weighing one-half pound is to be filled with 56 pounds of shelled seed corn. Now, if the balance weight 203 (FIG. 11) were set at the tare plus net, namely, 56½ pounds, each bag would be overweight by possibly as much as four ounces because of the aftercharge. In one bag, or a few, that amount would be insignificant, but when it is realized that, in a single season, even a medium size operator will bag as many as 20,000 bags of seed corn, he would be giving away considerable corn in overweight bags. It the seed corn example above, this overweight may be reduced to a small fraction of an ounce with my apparatus by first filling a few bags with the weight setting at 56½ pounds, each bag being weighed after filling to determine the overcharge. When that is determined at, say, 4 ounces, then the beam weight 203 is readjusted to 56¼ pounds. The bags will then consistently be filled with a 56 pound net of seed corn plus or minus a very small and insignificant amount due to unavoidable variation in density of the corn itself.

In conventional manual bagging methods, using beam type balances, another error, often quite unknown to the user, is present, and it, too, causes an overweight condition in the bag. Few users of beam type balances realize that, in the standard 1000 pound model, it takes about ¼ pound to move the pointer end of the scale from the weighing center point 200 (FIG. 11) up against the top stop 201. Consequently, many users fall into the habit of leveling or zeroizing the scale, by counterpoise 205, to the center point 200, and afterwards filling each bag until the beam pointer strikes the upper stop 201. While, of course, this gives a good, clear indication that the bag is filled, unfortunately, it means that the bag is overweight by 4 ounces.

With my presently disclosed weighing apparatus, no such convenient visual indication that the bag is filled is necessary because the filling and scaling operation is entirely automatic. Furthermore it gives far more accurate results than any manually operated method is capable of on a mass production scale. The shut-off point of the closure means can be very accurately controlled by the means disclosed because the switch 193 may be sensitive to movements of magnetic wand 214 in the order of .001".

Returning now to the description of the circuit and the various connections of the various circuit components as shown in FIG. 11, a main switch 251 and conductor 252 connects one side of valve actuatable switch 177 to line $E_2$, the other side being conencted through 253 to brake solenoid 96, thence by conductor 254 through brake control switch 191 and conductor 256 to line $E_1$.

Thus, when switches 251, 177 and 191 are all closed at the same time, the brake solenoid 96 will be energized but when any one is opened, it will be de-energized.

The stationary primary 186 is connected across conductors 253 and 256 so that whenever switch 177 is closed (that is, when valve closure means 47 is wide open), the primary is energized.

The movable secondary 187 is connected to the scale actuatable switch 193 by conductors 257 and 258. Thus, when the primary is energized and at the same time switch 193 is in closed condition, the board 188 will be moved upward to close brake control switch 191 by the mutual repulsion between the primary and secondary.

Agitation motor 106 is also connected across conductors 253 and 256 so that whenever switch 177 is closed the agitator spiral 118 is rotated.

An electrically actuated counter 259 is also connected across conductors 253, 256 to count the number of times switch 177 is closed while the main switch is on. During normal filling and sealing operation, this is the same as the number of bags filled.

The bag holding means, generally designated C may be that which is the subject of my United States Letters Patent No. 2,910,257, issued October 27, 1959, and is described in detail therein. It is designed to releasably support bags of various heights and diameters on the weighing platform 261 of scale E.

The bag holder is secured to a platform plate 262 which is supported on scale platform 261. A pair of spaced, upwardly extending supporting members 263 and 264 is mounted on the plate 262. Each member has a transverse forwardly extending upper portion 265 (FIG. 2) having mounted thereon a pair of serrated or jaw gripping members 266 and 267, the latter being adjustable along portion 265 for different bag widths. Supporting member 263 is fixed on plate 262. Member 264 is pivotal for movement toward and away from the other supporting member, and is biased away from the latter by spring means 268. Treadle means 269 is connected by a suitable linkage to move member 264 toward 263, against the bias of 268. Each of the supporting members is formed of two pieces "u" and "l" which are telescopically adjustable relative to one another to adopt the holder for use with various length bags.

Before describing the use of the bag holder it is thought best to describe the scale lifting and lowering means generally designated D. As shown in FIGS. 1 and 2, it comprises a pair of subtantially identical scissors-type jacks 271 and 271a mounted at the sides of platform 21 on the angle members 23. Each jack comprises a special pair of crossed arms 272 and 273, pivoted at the center on rivet or bolt 274 and separated by spacer bushing 276. At their forward end portions, pairs 272 are each pivotally mounted on boss 277 which is mounted, as by welding, on one of the angle members 23. A pivot pin 278 is provided in each of the bosses to carry the arms. Arm pairs 273 are each pivoted at the front end portion on a boss 281 mounted, as by welding, to the underside of a scale-carrying plate 280. Pinions 279 formed on the outside of each boss 281 provide means for pivotally mounting the arms 273. A bore (not specifically shown) is provided in each boss 281 to permit passage of rotatable shaft 286 in each jack. At the rear, arms 272 and 273 are provided with roller means 282 and 283, respectively, bearing against the underside of the plate 280 and the topsides of angles 23 and roll therealong during adjustment of the height of plate 280. Roller means 282 (FIG. 2a) each comprise a block 287 internally threaded for engagement with a threaded portion 288 of the corresponding shaft 286. Oppositely disposed pinions 289 on each block carry roller elements 291 which are held in place as by peening the ends of pinions 289.

Each shaft 286 is held against endwise movement toward the rear of the scale (that is, to the left, FIG. 2) by collar 292 pinned or otherwise fastened thereto. The collar bears against an apertured apron 293 formed at the front of the platform 280. At the rear is a similar formed apron 293a which acts to hold the plate 280 and shafts 286 in substantial parallelism. The carrier plate 280 is also formed with upstanding side edge portions 284 adapted to retain the scale against sidewise dislocation as best indicated in FIG. 1.

At the front end, each shaft 286 is provided with a toothed sprocket 294 which are joined for concurrent rotation by chain 296. The end of one of the shaft 286 is formed in any suitable manner for engagement by a crank 297, which is preferably removable, so the platform 280 may be raised and lowered by the jack means.

As described above the purpose of the jack means is to provide means for adjusting the up and down position of the entire bag-holder with respect to the valve casing to compensate for different height adjustments of the bag-holder. Thus it will be apparent that the jack means may be positioned either between the supporting means and the scale or between the scale and the bag-holder to carry out the same function.

The bag holding means C and the lifting and lowering means D will be employed as follows to accommodate a particular container or bag size: The position of jaws 266 and 267 and the lengths of supporting members 263—264 are adjusted for the diameter and length of the bag. Crank 297 will then be rotated to raise the entire scale E and bag holder C until the mouth of the bag (when attached) will be just beneath the valve casing outlet part 159.

When C and E are adjusted in the above manner, the operator depresses treadle 269 with his foot whereby the relatively movable supporting member including forwardly projecting portion 264 is moved toward the fixed supporting member. He then places the mouth portion of the bag over the rearmost jaws and pulls the bag mouth toward him. Because of the foot operation afforded by the treadle means, he can slide both hands along the mouth edge of the bag until the front of the bag mouth is pulled over the forwardmost jaws. Pressure upon the treadle is released simultaneously, thereby securely holding the bag in position. After the bag has been filled, the operator grips the opposite sides of the bag between the forward and rearward jaws. The spacing between the depending jaws on the forwardly projecting portions permits the operator to place his thumbs within the mouth of the bag to obtain a tight grip on the filled bag. The treadle 269 is depressed, allowing the operator to remove the filled bag from either the left side, right side, or front.

The mounting of the gripping jaws and the use of the treadle permits the operator the free use of both arms and hands in placing the empty bag upon the holder and in removing the filled bag. The treadle foot piece is preferably located below the level of the weighing platform to avoid all obstacles to the removal of the bag, and to facilitate transferring the bag to a moving belt which will carry it to a sewing machine for closing the mouth, if desired.

The use of the device to fill and weigh one bag of material, such as shelled seed corn, will be as follows: The operator opens the valve by moving the handle 64 to the broken line position shown in FIG. 3. This closes the valve actuatable switch 177 (FIG. 11), thereby energizing the stationary primary coil 186, and energizing and actuating agitator 106 and counter 259.

Turning the handle 64 in the opening direction also causes lever 67 to rotate the sampling means plug 137 to admit a sample of grain therein through passage 139. The sample will remain therein until the valve is closed.

The scale actuatable switch 193 is already in its normal closed position (FIG. 11). This is because the bag is empty, whereby the beam pointer end 199 and the magnetic wand 214 are in their lowermost positions. Thus, at the beginning of the operation, when the bag is empty, the movable secondary circuit 187—258—193—257 is closed.

The energization of the stationary coil by the closing of switch 177 while the secondary circuit is closed, as aforesaid, causes current to be induced in the secondary coil. The resultant magnetic fields of the two coils oppose one another, and the secondary coil and the brake control switch 191, which is carried therewith, are tilted upward on the pivotal plate 188. With the closing of switch 191, the brake solenoid 96 is energized, causing the brake strap 84 to be drawn tightly against the periphery of the brake disc 81, thereby maintaining the valve closure means 47 in open position as long as the brake solenoid coil is energized.

Filling of the bag then proceeds by seed corn flowing under the influence of gravity from the hopper (not shown) connected by a pipe 298 to the inlet port 37 of the valve casing, and thence, through the opening beneath baffle plate 122 between the closure elements 47a and 47b.

As the bag reaches the filled point, which is determined by the previous setting of weight 203 along the beam scale 204, the beam pointer 199 starts to move up. The opposite or counterpoise end 198 starts to move down. This permits the roller end 237 of control lever 212 to move down, causing the wand end 214 to move upward sufficiently to attract armature 216 of switch 193, thereby opening the latter switch. This opens the circuit of the movable secondary coil 187. The magnetic field, which has been maintaining the induced current coil 187 tilted above the primary coil, collapses, whereby that coil and the plate 88 which carries it, fall back, tilting the brake control switch 191 to open position.

The opening of the brake solenoid circuit at switch 191, causes the solenoid to be de-energized, whereupon the valve segments 47a—47b are permitted to be moved to their closed positions by the torsion springs 62. As the valve segments begin to turn toward closed position, the valve actuatable switch 177 is moved to open position, thereby de-energizing the stationary primary coil, the agitator motor 106, and the counter 259, so the apparatus will use no current until the next weighing operation initiated by movement of the handle.

The filled bag is removed after depressing the treadle 269 in the manner already described, an empty bag is hung on the supporting members, and the foot pedal is released to hold it in place. The diminished loading on the platform permits the beam to return to its unloaded position against the lower stop 202, which, in turn, causes the magnetic wand 214 to return to its lowermost position (shown greatly exaggerated in FIG. 11) to permit the scale actuatable switch 193 to return to its normal, closed position. The circuit is then ready for another filling and weighing cycle.

Figure 12:
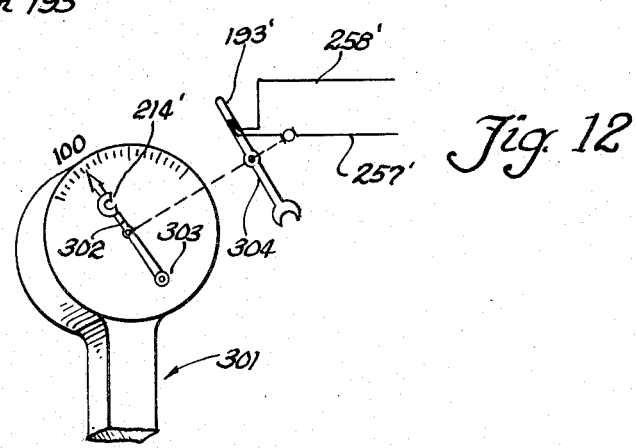
FIG. 12 is a fragmentary view of a modified circuit showing how a dial scale might be employed in carrying out the present invention.

FIG. 12 illustrates how a dial scale may be used in practicing the present invention. The dial scale, generally designated 301 will be mounted in the same way as the beam type scale E which has been described. To adapt the dial scale for use with other parts already described herein, a small magnet 214' (corresponding to magnetic wand 214 in FIG. 11) may be mounted for movement with the weight indicating member or pointer 302. The latter may be suitably counterpoised as at 303. Another counterpoised member, designated 304, is pivoted at the center of the scale dial, concentric with the pointer 302 and it carries a magnetically operable switch 193' (corresponding to switch 193 FIG. 11). Leads 257' and 258' would connect the switch with an operating circuit similar to that shown in FIG. 11. The switch 193' would thus be positioned adjacent the path of movement of the magnet 214' and the member 304 carrying the switch could be set at any weight indicating point on the dial scale at which it would be desired to initiate the closing of the control valve. In use, this modified circuit would be the same as that already described in connection with FIG. 11. The valve 47 would be opened manually (or by motor 70a) and held open by the electrically actuated brake means 96. As soon as the pointer 302 moved the magnet 214' under the switch 193' the latter would cause the field induced in secondary coil 187 to collapse and initiate the closing of the valve by releasing the brake means.

It will be understood that, in the appended claims, where the context permits, the term "bag" should be interpreted to include receptacles, containers, drums, kegs, and the like, for all such items may readily and advantageously be filled or "bagged" in accordance with the teaching of the present invention.

Furthermore, it should be understood that the term "weighing platform" used in certain of the claims includes any scale weight-responsive element, such as a pan or hook on spring suspension scales.

What is claimed is:

1. Filling and weighing apparatus comprising: a weighing scale having a weighing platform; valve means supported above said platform and having inlet and outlet ports with closure means therebetween, said inlet port being in communication with a source of material to be bagged; a bag-holder on the platform being biased to grip a bag with the bag mouth positioned to receive material discharging from said outlet port and foot operable means below the level of the platform for releasing the bag; means for opening said closure means to start the flow of material into the bag; and means responsive to indication by said scale of a pre-selected weight for closing said closure means to stop the flow of material into the bag.

2. Filling and weighing apparatus comprising: a weighing scale having means thereon for supporting a container to be filled; valve means supported above said platform and having inlet and outlet ports with closure means therebetween, said inlet port being in communication with a source of material to be weighed; manual means for opening said closure means to start the flow of material into the container; automatic closing means effective to close said closure means responsive to a predetermined weight on said scale; and means for controlling the automatic closing means including a first member movable responsive to movement of a weight indicating element on said scale and a second member positioned adjacent the path of movement of the first member, one of said members including a magnetically actuatable switch and the other including a magnet effective to actuate said switch on relative movement between said members.

3. Filling and weighing apparatus comprising: a weighing scale of the balance type having a beam which is movable responsive to a predetermined weight on said scale; valve means supported above said scale and having inlet and outlet ports with closure means therebetween, said inlet port being in communication with a source of material to be weighed, said outlet port being adapted to discharge said material into a container supported on said scale; manual means for opening said closure means to start the flow of said material into the container; closing means responsive to a predetermined weight of material on said scale for automatically closing said closure means to stop the flow of material into the container; and means for controlling the closing means including a first member movable by the scale beam and a second member positioned adjacent the path of movement of the first member, one of said members comprising a magnetically actuatable switch and the other comprising a magnet effective to actuate said switch on relative movement therebetween, and adjusting means for varying the beam position at which said switch is actuated.

4. Filling and weighing apparatus comprising: a weighing scale having a weighing platform; valve means supported above said platform and having inlet and outlet ports with closure means therebetween, said inlet port being in communication with a source of material to be bagged; common supporting means for the weighing scale and the valve means, the latter being spaced above the former; a bag-holder on the platform being biased to grip a bag with the mouth of the latter positioned to receive material discharging from said outlet port and foot operable means below the level of the platform for releasing the bag; means for adjusting the vertical length of the bag-holder for different length bags and means for adjusting the height of the scale platform on said supporting means to compensate for adjustment of the bag-holder height; means for opening said closure means to start the flow of material into the bag; and means responsive to indication by said scale of a preselected weight in said bag for closing said closure means to stop the flow of material into the bag.

5. Filling and weighing apparatus comprising: a weighing scale having a weighing platform; valve means having inlet and outlet ports and passages with operable closure means therebetween, said inlet port being in communication with a bin of material to be bagged; common supporting means for the weighing scale and the valve means, the valve means being supported above the weighing platform; a bag-holder on the platform having a portion thereof biased to grip a bag with the bag mouth positioned immediately below the outlet port and foot operable means to overcome the bias and release the bag; means for opening said closure means to start the flow of material into the bag; means controlled by said scale responsive to a predetermined weight on said platform to close said closure means to stop the flow of material into the bag; the aforesaid parts constituting a self-contained unit with said supporting means being mounted on casters for moving the unit between different bins of material to be bagged.

6. Filling and weighing apparatus comprising: a weighing scale having a weighing platform; valve means supported above said platform and having inlet and outlet ports with closure means therebetween, said inlet port being connected to a bin of material to be weighed; means for supporting a container on said platform adjacent the casing outlet port; means for opening said closure means to start the flow of material into said container; electrical means actuated responsive to opening of said closure means for maintaining the latter open until a predetermined weight of material enters the container; and means controlled by the scale for deactuating said electrical means to initiate the closing of said closure means responsive to said predetermined weight of material entering the container.

7. In a filling and weighing device, and in combination, a scale adapted to carry a receptacle in position to be filled and weighed, said scale having a movable weight-indicating member; valve means comprising a casing having inlet and outlet passages and a valve movable between open and closed positions to control the starting and stopping of flow of material therethrough, said valve means providing communication between a hopper for said material and said receptacle; means for releasably gripping the receptacle at the outlet of the casing and foot operable means for actuating the gripping means to grip and release the receptacle; biasing means for urging said valve to closed position; electrically actuatable brake means actuatable to hold said valve in open position; switch and circuit means effective to control the actuation of said brake means responsive to movements of said valve and scale weight-indicating member to hold said valve in open position until said member moves past a certain position to indicate a predetermined weight of material in said receptacle and to thereupon release said brake means to permit closing of the valve by the biasing means.

8. Filling and weighing apparatus comprising: a weighing scale having a weighing platform; valve means supported above said platform and having inlet and outlet ports with closure means therebetween, said inlet port being connected to a bin of material to be weighed; means for supporting a container on said platform adjacent the casing outlet port; means for opening said closure means to start the flow of material into said container; electrical means responsive to operation of the opening means to hold said closure means in open position; and automatic means rsponsive to a predetermined weight of material in said container for closing said closure means to shut off the flow of material.

9. Filling and weighing apparatus comprising: a weighing scale having a weighing platform; valve means supported above said platform and having inlet and outlet ports with closure means therebetween, said inlet port being connected to a bin of material to be weighed; means for supporting a container on said platform adjacent the casing outlet port; means biasing said closure means toward closed position; manually operable means for opening said closure means against the urgence of said biasing means to start the flow of material into said container, electrically energizable stop means for maintaining said closure means in open position against the urgence of said biasing means; switch and circuit means actuatable responsive to movement of the manual means to open position to energize the stop means to maintain the closure means in open position; and means controlled by said scale and operative responsive to the accumulation of a predetermined weight of material in said container to de-energize said stop means to permit closure of the closing means under the urgence of said biasing means.

10. Filling and weighing apparatus comprising: a weighing scale having a weighing platform; valve means supported above said platform and having inlet and outlet ports with closure means therebetween, said inlet port being connected to a bin of material to be weighed; means for supporting a container on said platform adjacent the casing outlet port; means biasing said closure means toward closed position; manually operable means for opening said closure means against the urgence of said biasing means to start the flow of material into said container; brake means for maintaining said closure means in open position against the urgence of said biasing means, including an element frictionally engageable with a member movable with said closure means, and electrically energizable means to press said element and member into frictional engagement with one another; switch and circuit means actuatable by said manual means when moving the closure means to opening position to energize the electrical means to maintain the closure means open against the urgence of said biasing means; and means controlled by the scale to de-energize said electrical means to release the brake means responsive to a predetermined weight of material in said container whereby to stop the flow of material.

11. Filling and weighing apparatus comprising: a weighing scale having a weighing platform; valve means supported above said platform and having inlet and outlet ports with closure means therebetween, said inlet port being conencted to a bin of material to be weighed; means for supporting a container on said platform adjacent the casing outlet port; means biasing said closure means toward closed position; manually operable means for opening said closure means against the urgence of said biasing means to start the flow of material into said container; brake means for holding said closure means in open position against the urgence of said biasing means; electrically energizable means for applying said brake means; circuit means controlling the electrical energization of said brake means including switch means actuatble upon operation of the opening means to energize the electrical means to apply the brake; said circuit also including switch means actuatable by said scale responsive to accumulation of a predetermined weight of material in the container to de-energize the electrical means to release the brake thereby permitting closure of the closure means under the urgence of the biasing means to shut off flow through the valve means.

12. Filling and weighing apparatus comprising: a weighing scale; valve means having inlet and outlet ports with closure means for controlling the flow of material therebetween, said inlet port being adapted to be connected to a bin of said material, said outlet port being positioned to discharge said material into a container supported in weighing position on said scale; means for opening said closure means to start the flow of said material into said container; scale actuatable switch means actuatable between operative positions responsive to a predetermined weight indication of said scale; valve actuatable switch means actuatable between operative positions responsive to movement of the opening means to open the closure means; electrically actuated means for controlling closure of the closure means; circuit means, including the scale and valve actuatable switch means and the electrically actuated means, effective to initiate the closing of the closure means responsive to said predetermined weight indication of the scale to stop the flow of material into the container.

13. Filling and weighing apparatus comprising: a weighing scale; valve means having inlet and outlet ports with closure means for controlling the flow of material therebetween, said inlet port being adapted to be connected to a bin of said material, said outlet port being positioned to discharge said material into a container supported in weighing position on said scale; means for opening said closure means to start the flow of said material into said container; means for biasing said closure means to closed position; electrically actuated brake means for holding said closure means in open position; circuit and switch means actuatable responsive to opening movement of said closure means to apply said brake means and actuatable responsive to a predetermined weight indication of said scale to release the brake means to permit closing of the closure means by the biasing means.

14. Filling and weighing apparatus comprising: a weighing scale; valve means having inlet and outlet ports with closure means for controlling the flow of material therebetween, said inlet port being adapted to be connected to a bin of said material, said outlet port being positioned to discharge said material into a container supported in weighing position on said scale; means for opening said closure means to start the flow of said material into said container; electrically actuated brake means for holding said closure means in open position; means for closing the closure means; scale actuatable switch means operable by said scale to a first position when the scale indicates less than a predetermined weight and to a second position when it indicates said weight; valve actuatable switch means operable by the opening means to a certain position when the latter opens the closure means; circuit means including both of said switch means; said scale actuatable switch means being operable, when moved to its said first position by the scale, to condition said circuit means for actuating the brake means; said valve actuatable switch means being operable, when in its said certain position and while the circuit means is conditioned as aforesaid, to actuate said brake means to hold the closure means open; and said scale actuatable switch means being operable, when moved to its said second position by the scale, to release said brake means to permit closing of the closure means by said closing means.

15. Filling and weighing apparatus comprising: a weighing scale; valve means having inlet and outlet ports with closure means therebetween, said inlet port being adapted to be connected to a bin of material, said outlet port being adapted to discharge into a container supported in weighing position on said scale; means for biasing said closure means toward closed position; manual means for opening said closure means; electrically energizable braking means for holding said closure means in open position; a first coil having switch and circuit means for energizing it responsive to movement of the manual means to open the closure means; a second coil in inductive relation to said first coil; one of said coils being movable by induced magnetic forces when the first coil is energized while the second coil is closed; scale actuating switch and circuit means for closing said second coil responsive to indication by said scale of less than a predetermined weight; brake control switch means associated with the movable coil and operative responsive to movement of that coil to energize the brake means; whereby, upon moving said manual means in the opening direction while the scale indicates less than said predetermined weight, said first coil is energized to induce a magnetic field in the second coil to move the movable coil to operate the brake control switch means to energize the brake means to hold said closure means in open position; and whereby further, when said scale indicates said predetermined weigh, said scale actuatable switch is operated to open the second coil to cause the induced field in the second coil to collapse to operate the brake control switch means to de-energize said brake means to permit the closure means to be closed under the urgence of the biasing means.

16. In a filling and weighing device, and in combination, a scale adapted to carry a receptacle in position to be filled and weighed, said scale having a movable weight-indicating member; valve means comprising a casing having inlet and outlet passages and a valve movable between open and closed positions to control the starting and stopping of flow of material therethrough, said valve means providing communication between a hopper for said material and said receptacle; means for releasably gripping the receptacle at the outlet of the casing and foot operable means for actuating the gripping means to grip and release the receptacle; biasing means for urging said valve to closed position; means for opening said valve; electrically actuated brake means actuatable between a condition to hold said valve in open position against the urgence of said biasing means and another condition to permit closing of said valve by said biasing means; a control circuit for said brake means including first, second and third switch means; the first switch means being actuatable responsive to operation of said opening means; the second switch means being actuatable to one condition responsive to movement of the scale weight-indicating member to indicate less than a predetermined weight; the third switch means being actuatable responsive to actuation of the first and second switch means as aforesaid to energize the brake means to its said condition to hold the valve in open position; said third switch being further actuatable responsive to actuation of the second switch to another condition, which condition is dependent on movement of the weight-indicating member to indicate said predetermined weight, to de-energize the brake means thereby permitting closing of the valve by the biasing means.

17. In a filling and weighing device, and in combination, a scale adapted to carry a receptacle in position to be filled and weighed, said scale having a movable weight-indicating member; valve means comprising a casing having inlet and outlet passages and a valve movable between open and closed positions to control the starting and stopping of flow of material therethrough, said valve means providing communication between a hopper for said material and said receptacle; means for releasably gripping the receptacle at the outlet of the casing and foot operable means for actuating the gripping means to grip and release the receptacle; biasing means for urging said valve to closed position; a solenoid-operated brake effective when energized to hold said valve in an open position against the urgence of said biasing means; a brake control switch connected to energize said solenoid; induction means having a primary coil and a secondary coil, one being movable relative to the other, the movable coil being effective to actuate said brake control switch between open and closed conditions; a scale actuatable switch actuatable between open and closed conditions by said scale weight-indicating member when the latter moves to and from a predetermined weight-indicating position and being connected to open and close the circuit through said secondary; a valve actuatable switch movable between open and closed positions by movement of said valve to open position and being connected to energize said primary and, when the brake control switch is closed, also to energize said solenoid to apply the brake to the valve; whereby when said valve is opened, while the scale indicates less than said predetermined weight, to initiate a filling and weighing cycle, the primary is energized through the valve actuatable switch to energize the secondary by induction through the scale actuatable switch to actuate the brake control switch to energize the brake solenoid and hold the valve in open position while the receptacle is being filled; and whereby further, when said receptacle is filled with a preselected weight of material and said indicating member is moved to indicate said predetermined weight, said secondary circuit will be opened by the scale actuatable switch to cause said brake control switch to de-energize the solenoid, release the brake, and permit closing of the valve by said biasing means.

18. In a filling and weighing device, and in combination, a scale adapted to carry a container in position to be filled and weighed, a valve casing having closure means therein mounted above said container position and having an inlet passage communicating with a source of said material and an outlet passage adapted to discharge material into said container, said inlet passage being offset horizontally from said outlet passage to avoid straight-through vertical flow of material from the source to the container, said closure means comprising a pair of elements rotatably mounted along spaced, parallel horizontal axes, each of said elements shaped in the form of a longitudinally truncated cylinder, said casing being formed complementarily to said valve elements to provide a material-tight closure when the valve is closed, and means for effecting synchronous turning movements of said elements between a closed position in which their non-truncated, cylindrical surfaces are in substantial abutting relationship to prevent flow and an open position wherein flow is permitted between said truncated portions; biasing means urging said valve to closed position, a flow regulating gate in said inlet passage adjustable to regulate flow therethrough in varying amounts, releasable gripping means adapted to support said container on said scale at a fixed distance beneath said valve, foot operated means for causing said gripping means to grip and release said receptacle, means for overcoming the bias on said closure means and moving it to open position, brake means operable in response to opening of said closure means to hold the latter in open position, means responsive to a predetermined weight of material in said container for releasing said brake means to thereby permit said closure means to be moved to closed position by said biasing means, manually operable means for overcoming the brake means to effect the closing of said closure means even when the material in said container is less than said predetermined weight, agitator means in said casing effective to loosen said material, said agitator means being operable responsive to an open condition of said closure means, said casing having a peripherally extending opening surrounding the outlet opening adjacent the periphery of the open end of the container, said peripherally extending opening being connected by passage means to a low pressure zone.

19. In a filling and weighing device, and in combination, valve means, comprising a casing having inlet and outlet passages with closure means therebetween, said inlet passage being offset horizontally from said outlet passage to avoid straight-through, vertical flow of material through the casing, said closure means comprising a pair of elements rotatably mounted along spaced, parallel, horizontal axes, each of said elements being shaped in the form of a longitudinally truncated cylinder, said casing being formed complementarily to said valve elements to provide a material tight closure when the closure means is closed, and means for effecting synchronous turning movements of said elements between a closed position in which their non-truncated, cylindrical surfaces are in substantial abutting relationship to prevent flow and an open position wherein flow is permitted between the truncated portions, biasing means urging said closure means to closed position, a flow regulating gate in said casing being adjustable to regulate flow therethrough in varying amounts, manual means for opening said closure means against the urgence of said biasing means, brake means operable in response to opening of said valve to hold the latter in open position, means responsive to a condition at a remote point for releasing said brake means to thereby permit said valve to be moved to closed position by said biasing means, and manually operable means for overcoming the brake means to effect the closing of said closure means at times.

References Cited in the file of this patent
UNITED STATES PATENTS

| | | |
|---|---|---|
| 291,474 | Finch | Jan. 1, 1884 |
| 565,228 | Richards | Aug. 4, 1896 |
| 824,888 | Sundby | July 3, 1906 |
| 936,613 | Douglass | Oct. 12, 1909 |
| 1,438,240 | Herman | Dec. 12, 1922 |
| 1,647,351 | Hague | Nov. 1, 1927 |
| 2,082,567 | Bleam | June 1, 1937 |
| 2,105,589 | Eades | Jan. 18, 1938 |
| 2,160,746 | Low | May 30, 1939 |
| 2,209,115 | Fitzgerald | July 23, 1940 |
| 2,260,718 | Merrifield | Oct. 28, 1941 |
| 2,310,689 | Gibson | Feb. 12, 1943 |
| 2,422,330 | Allerdice | June 17, 1947 |
| 2,678,756 | Gandrud | May 18, 1954 |
| 2,751,180 | Howard | June 19, 1956 |
| 2,790,619 | Schachte | Apr. 30, 1957 |
| 2,903,230 | Schachte | Sept. 8, 1959 |
| 2,910,257 | Gibbons | Oct. 27, 1959 |
| 2,968,948 | Rose | Jan. 24, 1961 |

FOREIGN PATENTS

| | | |
|---|---|---|
| 489,555 | Great Britain | July 28, 1938 |
| 646,144 | Great Britain | Nov. 15, 1950 |